US010620681B2

(12) United States Patent
Berthier et al.

(10) Patent No.: US 10,620,681 B2
(45) Date of Patent: Apr. 14, 2020

(54) ASYNCHRONOUS CORE PROCESSOR AND A SENSOR NODE COMMUNICATION MICROCONTROLLER INCLUDING THE SAME

(71) Applicant: Commissariat a l'energie atomique et aux energies alternatives, Paris (FR)

(72) Inventors: Florent Berthier, Sucy-en-Brie (FR); Olivier Debicki, Saint Vincent de Mercuze (FR); Olivier Sentieys, Perros-Guirec (FR); Edith Beigne, Meaudre (FR); Frederic Heitzmann, Meylan (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 102 days.

(21) Appl. No.: 15/621,451

(22) Filed: Jun. 13, 2017

(65) Prior Publication Data

US 2017/0357505 A1   Dec. 14, 2017

(30) Foreign Application Priority Data

Jun. 14, 2016   (FR) ..................... 16 55465

(51) Int. Cl.
*G06F 1/32*   (2019.01)
*G06F 9/30*   (2018.01)
(Continued)

(52) U.S. Cl.
CPC .............. *G06F 1/3206* (2013.01); *G06F 1/32* (2013.01); *G06F 1/329* (2013.01); *G06F 1/3243* (2013.01);
(Continued)

(58) Field of Classification Search
CPC .. G06F 9/3871; G06F 9/4812; G06F 11/3648; G06F 11/3656; G06F 1/3206; G06F 1/3243; G06F 9/3005
See application file for complete search history.

(56) References Cited

U.S. PATENT DOCUMENTS

| 5,621,886 | A  |   | 4/1997 | Alpert et al. |
| 7,788,332 | B2 | * | 8/2010 | Manohar ................ G01D 21/00 709/206 |

(Continued)

OTHER PUBLICATIONS

Ekanayake et al., "An Ultra Low-Power Processor for Sensor Networks", 2004, ACM. (Year: 2004).*

(Continued)

*Primary Examiner* — Benjamin P Geib
(74) *Attorney, Agent, or Firm* — Oblon, McClelland, Maier & Neustadt, L.L.P.

(57) ABSTRACT

This asynchronous processor core comprises a loading unit for sequentially loading instruction lines, functional units for executing instructions and a decoder for decoding instruction lines loaded by the loading unit into instructions executable by the functional units. It comprises an execution control module configured as a two-state automaton: a sleep state (S1), wherein the asynchronous processor core awaits an interrupt control signal to execute an interrupt routine; an execution state (S2), wherein the decoder awaits a new interrupt routine instruction line to be decoded. The execution control module additionally manages a state variable (status) of the loading unit to selectively authorize or prevent, according to at least the value of this state variable (status), the loading of a new instruction line.

13 Claims, 2 Drawing Sheets

(51) Int. Cl.
*G06F 11/36* (2006.01)
*H04W 52/02* (2009.01)
*G06F 1/3206* (2019.01)
*G06F 1/3234* (2019.01)
*G06F 1/329* (2019.01)

(52) U.S. Cl.
CPC ........ *G06F 9/30101* (2013.01); *G06F 11/362* (2013.01); *H04W 52/0219* (2013.01); *Y02D 10/152* (2018.01); *Y02D 10/24* (2018.01); *Y02D 50/20* (2018.01)

(56) References Cited

U.S. PATENT DOCUMENTS

| | | | | |
|---|---|---|---|---|
| 7,941,650 | B2* | 5/2011 | Kim | G06F 9/30003 712/221 |
| 2002/0065646 | A1* | 5/2002 | Waldie | G06F 11/3644 703/26 |
| 2006/0075210 | A1 | 4/2006 | Manohar et al. | |
| 2007/0214374 | A1* | 9/2007 | Hempstead | H04W 52/028 713/300 |
| 2008/0016374 | A1 | 1/2008 | Gee et al. | |

OTHER PUBLICATIONS

Hempstead et al., "An Ultra Low Power System Architecture for Sensor Network Applications", 2005, IEEE. (Year: 2005).*
French Preliminary Search Report dated Mar. 16, 2017 in French Application 16 55465 filed on Jun. 14, 2016 (with English Translation of Categories of Cited Documents).
Florent Berthier et al., "Power Gain Estimation of an Event-driven Wake-Up Controller dedicated to WSN's Microcontroller," Proceedings of the 13th International Conference (NEWCAS),New Circuits and Systems, IEEE, 978-1-4799-8893—Aug. 2015, 2015, pp. 4.
Zheng Liang et al. "On-chip Debug for an Asynchronous Java Accelerator," Proceedings of the Sixth International Conference on Parallel and Distributed Computing, Applications and Technologies, IEEE, 0-7695-2405—Feb. 2005, 2005, pp. 4.

* cited by examiner

ASYNCHRONOUS CORE PROCESSOR AND A SENSOR NODE COMMUNICATION MICROCONTROLLER INCLUDING THE SAME

FIELD

This invention concerns an asynchronous processor core and a microcontroller for a communicating sensor node comprising such a processor code.

It applies more specifically to an asynchronous processor core, that can be activated to sequentially execute instructions upon receipt of interrupt control signals, comprising:
- a loading unit for sequentially loading lines of instructions from a main memory which is external to the processor core,
- a decoder for decoding instruction lines loaded by the loading unit into executable instructions, and
- functional units for executing the executable instructions.

BACKGROUND

Asynchronous circuits are not pulsed by a clock signal and function according to a principle of data processing by requests and acknowledgements. Although occurring at the same time as synchronous circuits, they are not developed in the same proportions and today still remain hardly used. However, they have significant advantages, such as clearly lower energy consumption than synchronous circuits, a potential for increased speed in executing calculations, a truly shorter wake-up time (that is, useless to wait for a clock to stabilize) and a recognized resistance to variations in voltage (very useful when the energy supplied to the system is not stable over time). They are subsequently particularly well suited to applications such as WSN-type (Wireless Sensor Network-type) wireless communicating sensor network nodes or the IoT (Internet of Things).

An example of integrating an asynchronous processor, to one or several cores, in a microcontroller for a wireless communicating sensor node is described in the article of Berthier et al, entitled "Power gain estimation of an event-driven wake-up controller dedicated to WSN's microcontroller", published on pages 1-4 of the Proceedings of the 13$^{th}$ international NEWCAS ("New Circuits and Systems") conference, which was held in Grenoble (FR) from 7 to 10 Jun. 2015. Although such an asynchronous processor indeed has the advantages mentioned above, it remains sensitive to design, as its execution of interrupt routines is not simple to follow for a programmer. In particular, any debugging action is made difficult. In particular, no on-chip debugging unit is provided.

Yet, in the area of WSN networks or the IoT, the on-chip debugging function is essential to enable a programmer to go and read and write information on all the address space of a microcontroller, to stop the execution of a computer program, or further, to take things one step at a time on an instruction code while this is executed on the microcontroller processor. This function is common in synchronous circuits, but difficult to implement in asynchronous circuits and it is a real obstacle to their development.

An example in asynchronous technology, however, is disclosed in the article of Liang et al, entitled "On-chip debug for an asynchronous Java accelerator", published on pages 312-315 of the Proceedings of the 6$^{th}$ international PDCAT ("Parallel and Distributed Computing Applications and Technologies") conference, which was held in Dalian (CN) from 5 to 8 Dec. 2005. It relates to an asynchronous Java accelerator connected to an ICE debugging unit. But in this article, the ICE debugging unit is implemented in synchronous technology and the management as well as the use by the Java accelerator of different signals (D_req, R_req, E_req, M_req, W_req, ICE_req) exchanged with the ICE unit are not clearly described in asynchronous logic, this logic not being further detailed. Moreover, the implementation of debugging functions of the ICE unit is hardware, which brings a certain complexity and a rigidity to the overall architecture.

SUMMARY

It can thus be desired to provide an asynchronous processor which enables at least one part of the problems and limitations mentioned above to be avoided.

An asynchronous processor core is therefore proposed, that can be activated for the sequential execution of instructions upon receipt of interrupt control signals, comprising:
- a loading unit for a sequential loading of instruction lines from a main memory which is external to the processor core,
- a decoder for decoding instruction lines loaded by the loading unit into executable instructions,
- functional units for executing the executable instructions, and
- an execution control module configured as a two-state automaton:
    - a sleep state wherein the asynchronous processor core awaits an interrupt control signal to execute an interrupt routine, and
    - an execution state wherein the decoder awaits a new instruction line of interrupt routine to be decoded,
the execution control module further managing a state variable of the loading unit to selectively authorize or prevent, according to at least the value of this state variable, the loading of a new instruction line by the loading unit.

Thus, the asynchronous logic defined by this specific configuration of the execution control module of the asynchronous processor core simply enables an intervention in executing interrupt routines. It is particularly possible, using such an asynchronous logic, to control the sequential loading of instruction lines to be executed and consequently to take things one step at a time in the execution of an interrupt routine or to suspend it, to then take it back again as desired. An on-chip debugging function can thus be considered, which could be implemented transparently for a programmer, in other words, independent from the asynchronous character of the processor core. In addition, the asynchronous logic proposed has a very low material cost, which could be limited to a two-state automaton, additionally managing a state variable of the loading unit.

Optionally, the execution control module is configured to:
- go to the execution state upon receipt, by the processor core, of an interrupt control signal to execute an interrupt routine, and to authorize the loading of a first instruction line of this interrupt routine on this occasion, and
- go from the execution state to the sleep state after receipt, by the processor core, of a last interrupt routine instruction line.

Also optionally, the execution control module is configured to, upon receipt of a new instruction line loaded from the main external memory when it is in the execution state:
- determine if it is about an instruction line requiring a suspension of interrupt routine, then if it is about an instruction line requiring a suspension of interrupt routine, prevent the loading of a new instruction line from the main external memory, or if not, selectively authorize or prevent the loading of a new instruction line from the main external memory only according to the value of the state variable of the loading unit.

Also optionally, the sleep or execution state as well as the value of the state variable of the loading unit, to authorize or prevent the loading of a new instruction line, is information data stored in respective status registers of the processor core to which the execution control module has reading and/or writing access.

Also optionally, an asynchronous processor core according to the invention can include means for receiving and storing debugging instructions.

Also optionally, the receiving and storing means include control registers accessible to read by the execution control module and provided for the recording, by a debugging unit external to the processor core having writing access to these control registers, of the debugging instructions.

Also optionally, the debugging instructions comprise:
an instruction to suspend interrupt routine in the process of execution,
an instruction to restart suspended interrupt routine,
an instruction to execute one single interrupt routine instruction line,
and the execution control module is configured to, in considering each debugging instruction:
update the value of the state variable of the loading unit to prevent the loading of a new instruction line when it is about an interrupt routine suspension instruction,
authorize the loading of a new instruction line and update the value of the state variable of the loading unit to authorize the loading of a new following instruction line when it is about an instruction to restart interrupt routine,
authorize the loading of a new instruction line when it is about an instruction to execute one single interrupt routine instruction line.

A microcontroller for a communicating sensor node is also proposed, having an architecture comprising:
a first part comprising a wake-up processor that can be activated upon receipt of interrupt control signals,
a second part comprising a main processor that can be activated only when requested by the wake-up processor,
wherein:
the wake-up processor comprises at least one asynchronous processor core according to the invention, including functional units suitable for data exchanges between the microcontroller and at least one peripheral, to manage a wake-up protocol, as well as to manage functioning frequencies and powers of communicating sensor node components, and
the main processor comprises additional functional units for executing complex calculations not made by the wake-up processor.

Optionally, a microcontroller according to the invention can comprise a debugging unit in its first part, this debugging unit having access to the wake-up processor, via an asynchronous data transmission bus, for sending debugging instructions.

Optionally, a microcontroller according to the invention can comprise a main memory in its first part, this main memory comprising instruction lines of at least one interrupt routine and being accessible by the wake-up processor, via an asynchronous data transmission bus, for a sequential loading of instruction lines.

BRIEF DESCRIPTION OF THE DRAWINGS

The invention will be better understood using the description which will follow, given only as an example and made by referring to the appended drawings wherein.

DETAILED DESCRIPTION

Figure 1:
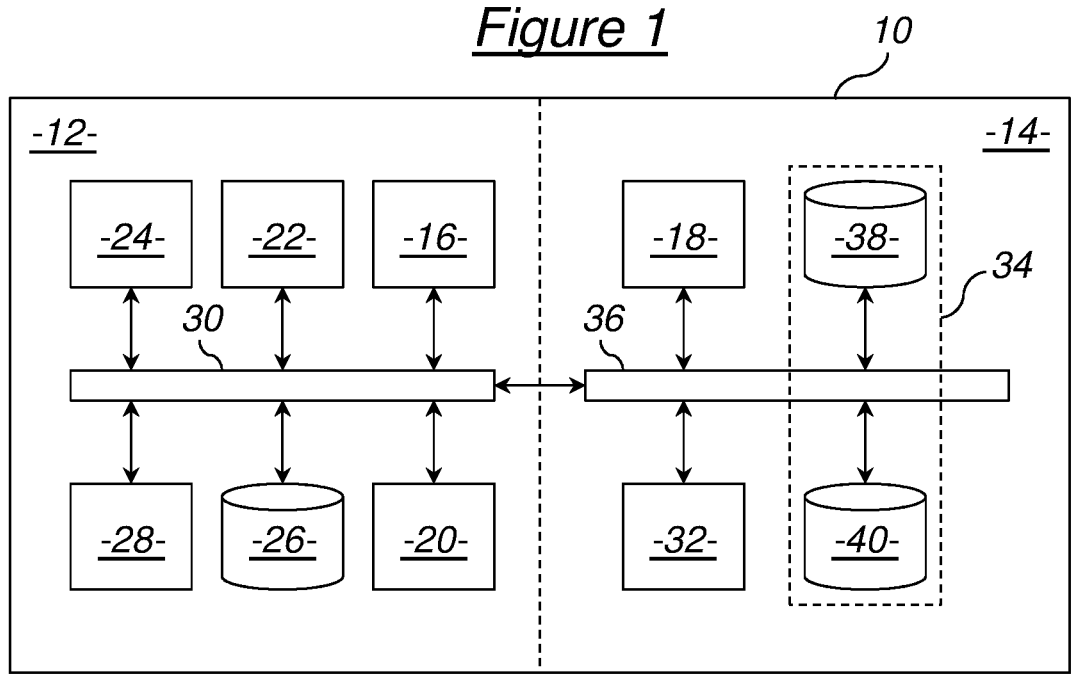
FIG. 1 diagrammatically represents the general structure of an example of a microcontroller which can comprise an asynchronous processor core according to the invention, FIG. 2 diagrammatically represents the general structure of an always-reactive part of the microcontroller of FIG. 1 including an asynchronous processor core according to an embodiment of the invention, and FIG. 3 partially illustrates a variant of the embodiment of the asynchronous processor core of FIG. 2.

The microcontroller 10 illustrated in FIG. 1 is suitable for a communicating sensor node, in other words, any one of the nodes of a wireless communicating sensor WSN network. It has a two-part architecture 12, 14, as outlined in the article of Berthier et al mentioned above. The first part 12, always reactive, comprises a wake-up processor 16 that can be activated upon receipt of interrupt control signals. The second part 14, reactive on request, comprises a main processor 18 that can be activated only when requested by the wake-up processor 16.

More specifically, the wake-up processor 16 comprises at least one asynchronous processor core that conforms with the invention, for example implemented with QDI ("Quasi Delay insensitive") logic. Moreover, the first part 12 further comprises:
a general interface module 20 that interfaces with peripherals, able to receive varied signals (alerts, clock or timer signals, events, etc.) coming from different peripherals,
a unit 22 for generating interrupt control signals, connected to the general interface module 20 to receive its different signals, and to the wake-up processor 16 to send it interrupt control signals,
an energy management unit 24, able to manage energy resources enabling the microcontroller 10 to function and connected to the unit 22 for generating interrupt control signals to be able to be activated when an interrupt control signal must be sent to the wake-up processor 16,
a main memory 26 external to the wake-up processor 16,
a debugging unit 28, and
an asynchronous data transmission bus 30, to which each one of the six elements 16, 20, 22, 24, 26 and 28 is connected.

In the second part 14, the main processor 18 is synchronous. Moreover, this second part 14 comprises another general interface module 32 which interfaces with peripherals, another main memory 34 external to the main processor 18 and an AHB data transmission bus 36 ("Advance High-performance Bus"). The main memory 34 is illustrated in FIG. 1 as subdivided into two separate memories 38 and 40, one for storing computer program instructions, the other for storing processing data. But it can also relate to one single and same memory.

The two buses 30 and 36 are interconnected or can constitute one single and same data transmission bus.

The advantage of such a two-part architecture, one always reactive to the asynchronous processor and the other reactive on request (from the always-reactive part) with a synchronous processor, is to benefit from the advantages of the asynchronous processor 16 in terms of energy consumption, wake-up time and resistance to the variations in voltage for the part of the microcontroller which must remain reactive all the time, and from those of the synchronous processor 18 in terms of calculating power for the less-requested part. Thus, the asynchronous wake-up processor 16 is advantageously equipped with functional units with limited capacities, for example for data exchanges between the microcontroller 10 and at least one peripheral, for managing a wake-up protocol and for managing functioning frequencies and powers of components of the considered communicating sensor node. On the contrary, the main synchronous processor 18 is equipped with additional functional units with increased capacities, for example to execute complex calculations not made by the wake-up processor 16.

Figure 2:
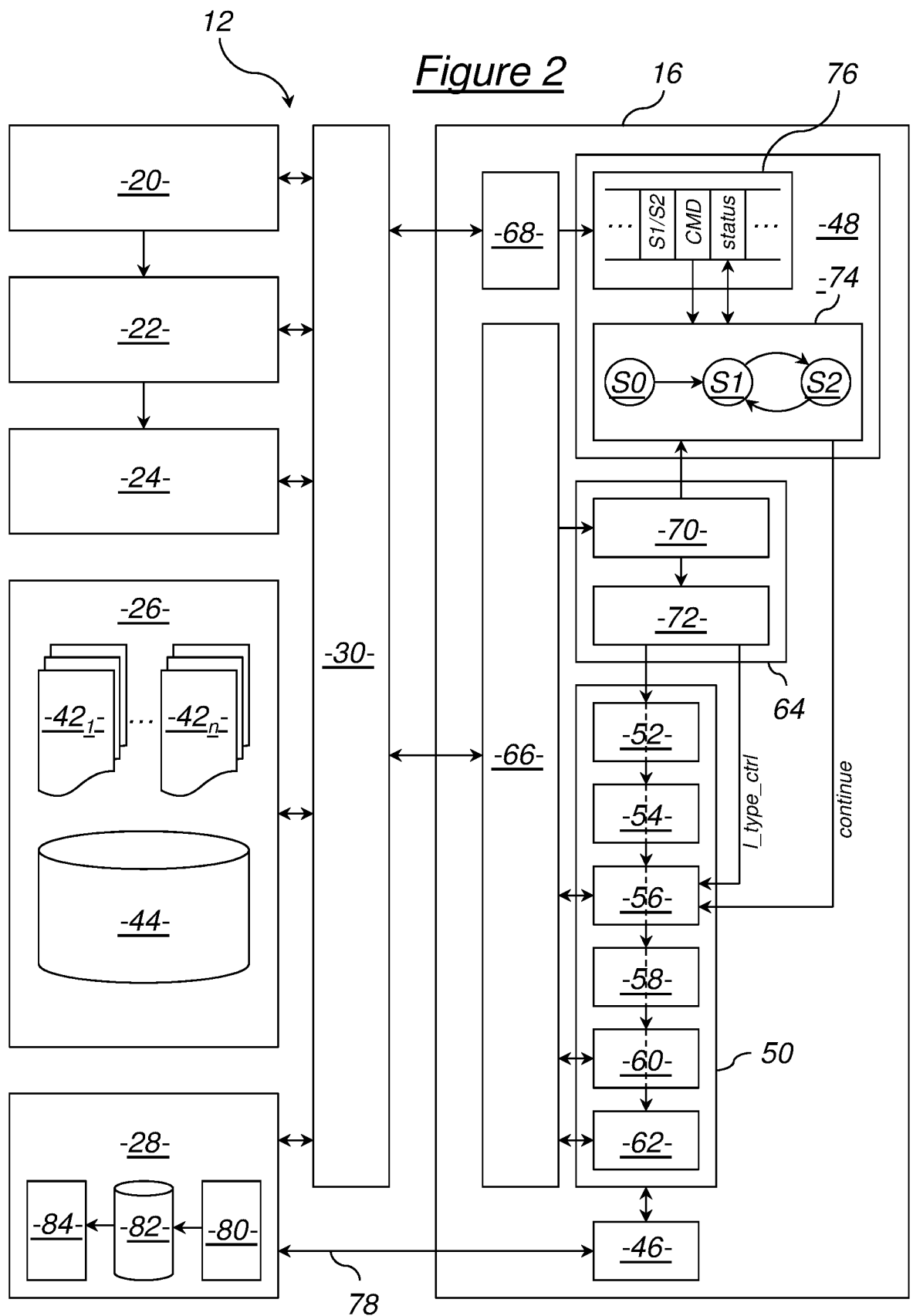

FIG. 2 illustrates the first always reactive part 12, with more details than in FIG. 1, in particular concerning the wake-up processor 16 constituted in this example of one single asynchronous processor core that conforms with the invention.

The main memory 26 is also detailed. It comprises interrupt routines $42_1, \ldots, 42_n$, each one of these routines being constituted from software instruction lines. It additionally comprises storage space 44 for processing data (data processed or to be processed with software).

The wake-up processor 16 works asynchronously. In other terms, it is configured to execute any one of the interrupt routines $42_1, \ldots, 42_n$, upon receipt of a corresponding interrupt control signal sent by the generation unit 22. The transmission of interrupt control signals is not made necessarily via the asynchronous bus 30. A specific connection can advantageously be provided (not illustrated in FIG. 2) between the generation unit 22 and the wake-up processor 16. Each interrupt control signal clearly identifies an interrupt routine.

To fulfil its functions, the wake-up processor 16 is configured in a way to comprise:
- a set 46 of general registers,
- an interrupt routine execution control module 48,
- a set 50 of functional units, amongst which:
  - an arithmetic and logic unit 52,
  - a connection unit 54,
  - a loading unit 56 for sequentially loading instruction lines from the main memory 26,
  - a unit 58 for moving data in register,
  - a unit 60 for calling on predefined functions, and
- a unit 62 for exchanging data between the main memory 26 and the general registers 46 of the wake-up processor 16,
- a decoder 64 for decoding instruction lines loaded by the loading unit 56 into executable instructions,
- a master interface 66, and
- a slave interface 68.

It is noted that amongst the functional units of the set 50, the units 52, 54, 58, 60, 62 are functional units for executing the executable instructions supplied by the decoder 64 after decoding of the instruction lines loaded by the loading unit 56.

In a known way per se, the decoder 64 is for example configured into two separate functional modules: a pre-decoder 70 and a decoding module 72. The pre-decoder 70 is designed to sequentially receive instruction lines, of which the loading has been previously required by the loading unit 56 and to inform the execution control module 48 about it, according to modes which will be detailed below. Each instruction line received by the pre-decoder 70 is then transmitted to the decoding module 72 to be translated into an instruction that is executable by the functional units of the set 50. To do this, the decoding module 72 transmits a series of corresponding control signals, via dedicated transmission lines, to the functional units of the set 50 and to the set 46 of general registers in a way to coordinate them to specifically execute the decoded executable instruction.

According to the invention, the execution control module 48 is configured as a two-state automaton 74:
- a sleep state S1 wherein the wake-up processor 16 is awaiting an interrupt control signal to execute an interrupt routine, and
- an execution state S2 wherein the decoder 64 awaits a new instruction line of an interrupt routine which is in the process of execution to be decoded.

Also, there is, optionally and conventionally, an initialization state S0, unstable and automatically leading to the sleep state S1 after an initialization phase.

On the contrary, the two states S1 and S2 are stable. The two-state automaton 74 of the execution control module 48 is configured to go from one to the other according to the following rules:
- it goes from the sleep state S1 to the execution state S2 upon receipt, by the wake-up processor 16, of an interrupt control signal to execute an interrupt routine, and
- it goes from the execution state S2 to the sleep state S1 after receipt, by the wake-up processor 16, of a last interrupt routine instruction line.

When going from the S1 to S2 state, the execution control module 48 is configured to authorize, on this occasion, the loading of a first instruction line of the interrupt routine which is identified in the interrupt control signal. This authorization function can, for example, be implemented in the form of a specific "continue" signal, sent by the execution control module 48 to the loading unit 56, knowing that this loading unit is configured to not require the loading of a new interrupt routine instruction line (including the first one), as long as a "continue" signal has not been emitted by the module 48. The "continue" signal is, for example, "Single Rail" type, in other words, a signal thread and an acknowledgement thread.

When it is in its execution state, and when there is still at least one new instruction line of an interrupt routine in the process of execution to be loaded, the execution control module 48 additionally manages a state variable "status" of the loading unit 56 to selectively authorize or prevent, according to at least the value of this state variable, the loading of a new instruction line by the loading unit 56. The value is, for example, binary: "run" when the loading of a new instruction line by the loading unit 56 is authorized, "stop" when the loading of a new instruction line by the loading unit 56 must be prevented. The functioning principle of the two-state automaton 74 of the module 48 can then be to view the value of this state variable "status" before deciding whether to send, or not, a "continue" signal for the loading, or not, of a new instruction line.

In concrete terms, the two states S1, S2 and the state variable "status" can be kept in memory and updated in a set 76 of control and status registers of the execution control module 48.

In terms of data exchanges between the elements of the wake-up processor 16 and the other components of the first always reactive part 12 of the microcontroller 10, the loading unit 56 is provided to exchange addresses of instruction lines with the main memory 26 via the master interface 66 and the asynchronous bus 30. The functional units 60 and 62, respectively for calling on pre-defined functions and for exchanging data between the main memory 26 and the general registers 46, are provided to exchange addresses of processing data or the data itself with the main memory 26 via the master interface 66 and the asynchronous bus 30. The pre-decoder 70 is provided to sequentially receive instruction lines coming from the main memory 26 via the master interface 66 and the asynchronous bus 30. The two-state automaton 74 is provided to exchange signals with the unit 22 for generating interrupt control signals via dedicated connections without using the asynchronous bus 30. Finally, the set 76 of control and status registers is provided to receive signals or instructions for storing via the slave interface 68 and the asynchronous bus 30.

When at the sleep state S1, the wake-up processor 16 awaits an interrupt control signal to execute an interrupt routine. More specifically, it is the two-state automaton 74 which awaits an interrupt control signal coming from the generation unit 22. This happens when the general interface module 20 supplies signals of which the receipt by the generation unit 22 leads to the activation of an interrupt routine. To do this, the generation unit 22 can be configured itself as a finite-state automaton according to which each interrupt routine stored in the main memory 26 is activated according to a predetermined combination, which is specific to said each interrupt routine, of at least one part of the signals supplied by the general interface module 20. The activation of an interrupt routine leads to the activation of the energy management unit 24 and the generation of a corresponding interrupt control signal.

When the two-state automaton 74 receives an interrupt control signal, this leads to the extraction, from this control signal, of an interrupt vector comprising an address indicating, directly or indirectly, the positioning of the first considered interrupt routine's instruction line in the main memory 26. This also leads to going from the sleep state S1 to the execution state S2 and to sending a "continue" signal as well as the interrupt vector to the loading unit 56.

Upon receipt of the "continue" signal and the interrupt vector, the loading unit 56 loads the address contained in the interrupt vector and sends a loading request of the first instruction line to the main memory 26. This first instruction line is received by the pre-decoder 70.

If this first instruction line can be decoded into an executable instruction by the functional units of the set 50 and if the considered interrupt routine comprises more than one instruction line, then the pre-decoder 70 sends a following instruction request signal to the two-state automaton 74 and transmits the instruction line to the decoding module 72. The decoding module 72 transforms the instruction line into an instruction to be executed by the functional units and in particular enables the loading of the following instruction line of the considered interrupt routine by transmitting an "I_type_ctrl" type signal comprising information enabling it to find, directly or indirectly, the positioning of this following instruction line in the main memory 26 to the loading unit 56. At the same time, when the two-state automaton 74 receives the following instruction request signal from the pre-decoder 70, it views the value of the state variable "status". If this value is at "run", then it sends a "continue" signal to the loading unit 56 so that it allows the loading of a new instruction line by the loading unit 56. Otherwise, it sends nothing, so that it prevents the loading of a new instruction line by the loading unit 56. It is only upon receipt of the two "I_type_ctrl" and "continue" signals, that the loading unit 56 loads the address indicated by the "I_type_ctrl" signal, and sends a request for loading the following instruction line to the main memory 26.

If the first instruction line is also the last instruction line of the considered interrupt routine, then the pre-decoder 70 sends an end of interrupt routine signal to the two-state automaton 74 and transmits the instruction line to the decoding module 72 if it can be decoded into an instruction executable by the functional units of the set 50. The decoding module 72 then transforms the instruction line into an instruction to be executed by the functional units. At the same time, when the two-state automaton 74 receives the end of interrupt routine signal from the pre-decoder 70, this leads to going from the execution state S2 to the sleep state S1 and to sending, after execution of the last instruction, of information of the end of execution to the unit 22 for generating interrupt control signals. This unit can then send this information to the energy management unit 24 so that it is consequently adapted.

The functioning detailed in the two previous paragraphs is repeated on each receipt of a new instruction line by the pre-decoder 70 until the end of executing the considered interrupt routine.

In particular, it is noted that the loading unit 56 is authorized to proceed with loading a new instruction line only upon receipt of the "continue" signal and the interrupt vector to load the first instruction line, or the "continue" signal and the "I_type_ctrl" signal to load any other instruction line. Therefore, there can be no loading of a new instruction line while the "continue" signal is not sent by the execution control module 48. This meeting between two signals can be implemented in the form of "Muller C-gates", in the loading unit 56 (this is the example illustrated in FIG. 2), the decoder 64, the execution control module 48 or otherwise.

Given that the sending of the "continue" signal by the execution control module 48 is subject to conditions, in particular at least upon receipt of an interrupt control signal or to the "run" value of the state variable "status" as this has been seen previously, it is clear that this implementation combined with the specific two-state automaton 74 configuration of the execution control module 48 leads to a functioning of the wake-up processor 16 such as its execution can easily be managed by a programmer. In particular, it enables simple intervention in the execution of interrupt routines by controlling the sequential loading of instruction lines to be executed and consequently to take things one step at a time in executing an interrupt routine or to suspend it to then take it back as desired.

An optional on-chip debugging function can also advantageously be considered, as this will now be detailed.

According to this debugging function, it is first anticipated that a programmer can replace one or several instruction lines, that can be decoded into executable instructions by the functional units of the set 50, from one or several interrupt routines $42_1, \ldots, 42_n$ respectively by one or several instruction lines requiring a suspension of interrupt routine. A specific formalism is, for example, provided to identify this type of instruction line.

Thus, each time the pre-decoder 70 receives a new instruction line requiring a suspension of interrupt routine, it is identified as not being decodable into an executable instruction by functional units of the set 50, so that the pre-decoder 70 does not transmit it to the decoding module 72. However, it sends an interrupt routine suspension request signal to the two-state automaton 74, upon receipt of which this automaton is configured to not send any "continue" signal and to assign the "stop" value to the state variable "status". This has the result of preventing the loading of a new instruction line from the main memory 26, whatever the value of the state variable "status" before receipt of this interrupt routine suspension request signal. It also sends an "I_type_ctrl" signal to the loading unit specifying to be prepared to load the same instruction line.

In this way, it is very easy for a programmer to position as many interrupt routine suspensions as desired in their instruction lines.

According to the debugging function, a programmer can additionally interact with the debugging unit to transmit debugging instructions, while the wake-up processor 16 is in its execution state S2. To enable this, the wake-up processor 16 comprises receipt and storage means for these debugging instructions, implemented in the form of control registers "CMD". These registers are, for example, included in the set 76 of control and status registers of the module 48. They are accessible to read by the two-state automaton 74 of the execution control module 48 and to write, via the asynchronous bus 30 and the slave interface 68, by the debugging unit 28.

The debugging instructions which can thus be transmitted through the debugging unit 28 to the two-state automaton 74 comprise at least:
 a "C-stop" instruction for suspending an interrupt routine in the process of execution,
 a "C-run" instruction for restarting a suspended interrupt routine,
 a "C-step" instruction for executing one single interrupt routine instruction line.

Consequently, the two-state automaton 74 of the execution control module 48 is configured to:
 in considering a "C-stop" instruction read in the "CMD" register, assign the "stop" value to the state variable "status" and not send any "continue" signal to the loading unit 56, which leads to a suspension of the interrupt routine,
 in considering a "C-run" instruction read in the "CMD" register, assign the "run" value to the state variable "status" and send a "continue" signal to the loading unit 56, which leads to a resumption of the interrupt routine, and
 in considering a "C-step" instruction read in the "CMD" register, send a "continue" signal to the loading unit 56 without modifying the value of the state variable "status", which leads to the execution of one single instruction line of the interrupt routine.

In this way, it is very easy for a programmer to use well-known on-chip debugging tools in an asynchronous processor context and without this asynchronous context being disruptive.

More specifically, concerning the instruction lines requiring an interrupt routine suspension, when an interrupt routine is suspended following the loading of such an instruction line, the programmer must, in a way know per se, replace in the main memory 26, the instruction line requiring the suspension by the instruction line decodable into an executable instruction that it replaced, to then relaunch the considered interrupt routine by a "C-run" or "C-step" instruction. In this way, the interrupt routine's execution is resumed at the location of the instruction line which had required the suspension.

Suspension instructions and debugging instructions previously mentioned constitute invasive FGDM (ForeGround Debug Mode) tools.

According to the debugging function, it is additionally possible to complete FGDM tools with non-invasive BGDM (BackGround Debug Mode) tools.

These BGDM tools comprise for example:
 asynchronous duplication modules (not illustrated in FIG. 2), placed in outputs of the master interface 66, the loading unit 56, the unit 60 for calling on pre-defined functions and the data exchange unit 62,
 a specific connection 78 between the debugging unit 28 and the set 46 of general registers of the wake-up processor 16,
 a surveillance module 80 implemented in the debugging unit 28, intended to receive duplicated data using the aforementioned duplication modules and at least part of the data coming from the set 46 of general registers, and configured to concatenate all this data,
 a local buffer memory 82 implemented in the debugging unit 28, intended to receive data concatenated by the surveillance module 80, and
 an output port 84 implemented in the debugging unit 28, intended to receive data concatenated temporarily stored in the buffer memory 82 and to send it outside of the microcontroller 10 for analysis.

The embodiment detailed above in reference to FIG. 2 is applicable simply to an asynchronous wake-up processor, or more generally, to any asynchronous processor core, of which the instruction cycles follow each other without temporally overlapping each other. An instruction cycle is constituted of the set of three successive steps consisting of loading an instruction (operation executed by the loading unit 56), decoding the instruction (operation executed by the decoder 64) and executing the instruction (operation executed by the functional execution units 52, 54, 58, 60, 62).

Figure 3:
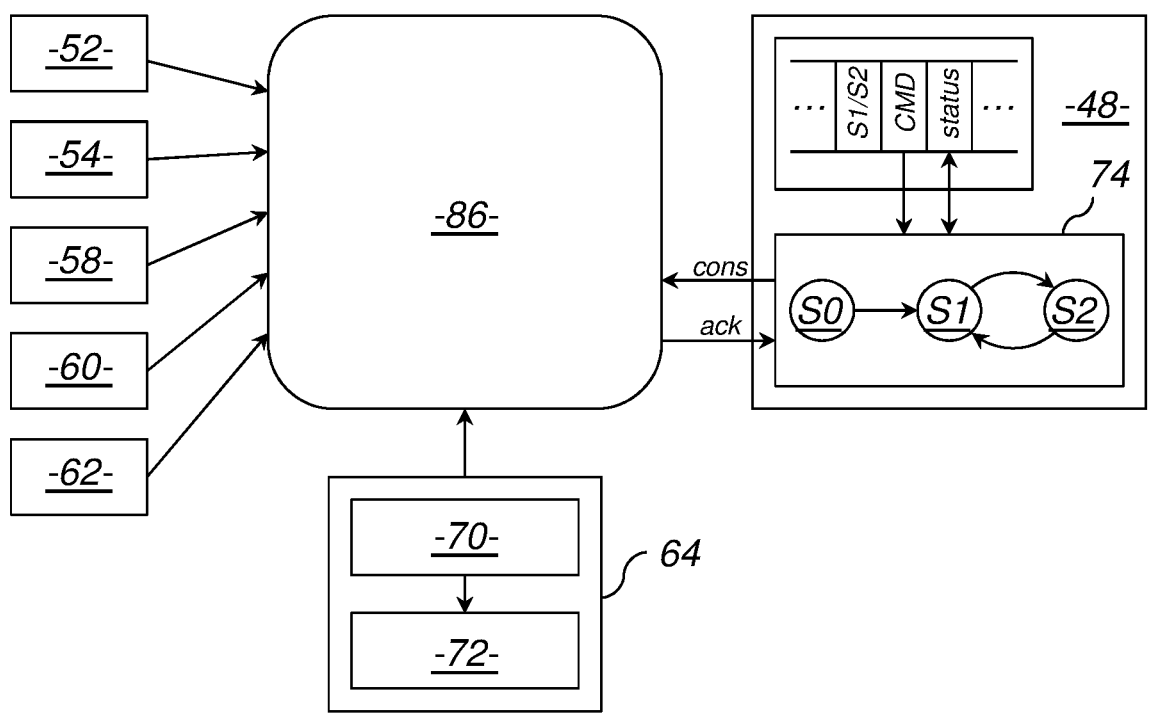

A perfected asynchronous processor core can function in pipeline mode according to which the execution of an $n^{th}$ instruction by the functional execution units is done at the same time as the decoding of an $(n+1)^{th}$ instruction by the decoder 64 and also at the same time as the loading of an $(n+2)^{th}$ instruction by the loading unit 56. In this pipeline functioning mode, it is necessary to slightly adapt the architecture of the wake-up processor 16 to be able to correctly manage the "C-stop" and "C-step" instructions. This is a non-exhaustive example of such an adaptation which will now be described in reference to FIG. 3.

In this figure, an occupation management module 86 is interposed between the execution control module 48, on the one hand, and the functional execution units 52, 54, 58, 60, 62 as well as the decoder 64, on the other hand. It receives occupation indication signals from the functional execution units 52, 54, 58, 60, 62 and from the decoder 64. When a "C-stop" or "C-step" instruction must be considered by the execution control module 48 (this instruction bearing general "cons" reference in FIG. 3), it transmits it to the occupation management module 86 and awaits an "ack" acknowledgement signal before applying it. This "ack" acknowledgement signal is only returned by the occupation management module 86 when all occupation indication signals from the functional execution units 52, 54, 58, 60, 62 and from the decoder 64 indicate that they are not occupied. Thus, thanks to this small adaptation, it is possible to implement the principles of the invention in a simple way in the wake-up processor 16.

It clearly appears that an asynchronous processor core microcontroller such as that described previously enables a broad development for its use within communicating sensor nodes, since it uses the advantages of asynchronous processor cores, while simply ensuring, and at a lower cost, in terms of architecture, the control of their execution by a programmer, in particular enabling to proceed with on-chip debugging in a transparent way for the user.

Moreover, it will be noted that the invention is not limited to the embodiments previously described.

For example, the architecture of the wake-up processor 16 can take a number of different forms. In particular, the execution control module 48 could be integrated into the decoder 64.

More generally, it will appear to a person skilled in the art, that various modifications can be applied to the embodiments described above, in light of the teaching which has just been disclosed to them. In the claims which follow, the terms used must not be interpreted as limiting the claims to the embodiments outlined in this description, but must be interpreted to include all equivalents that the claims aim to cover, because of their wording and which can be carried out by a person skilled in the art, by applying their general knowledge to the implementation of the teaching which has just been disclosed to them.

The invention claimed is:

1. An asynchronous processor core, that can be activated for the sequential execution of instructions upon receipt of interrupt control signals, comprising:
    a loader configured to sequentially load, based on a state variable (status) thereof, instruction lines from a main memory which is external to the processor core,
    a decoder configured to decode instruction lines loaded by the loader into executable instructions,
    functional units configured to execute the executable instructions, and
    an execution controller configured to place the asynchronous processor core selectively in one of a two-state automaton, the two-state automaton including:
    a sleep state (S1) wherein the asynchronous processor core awaits an interrupt control signal to execute an interrupt routine, and
    an execution state (S2) wherein the asynchronous processor core executes an interrupt routine and the decoder awaits a new interrupt routine instruction line to be decoded, and
    the execution controller further manages the state variable (status) of the loader to selectively authorize or prevent, according to at least a value of the state variable (status) of the loader, the loading of a new instruction line by the loader when the asynchronous processor core is in the execution state and at least one additional new instruction line is to be loaded.

2. The asynchronous processor core as claimed in claim 1, wherein the execution controller is configured to:
    go to the execution state (S2) upon receipt, by the processor core, of an interrupt control signal to execute an interrupt routine, and to authorize the loading of a first instruction line of this interrupt routine on this occasion, and
    go from the execution state (S2) to the sleep state (S1) after receipt, by the processor core, of a last interrupt routine instruction line.

3. The asynchronous processor core as claimed in claim 1, wherein the execution controller is configured to, upon receipt of a new instruction line loaded from the main external memory when the processor core is in the execution state (S2):
    determine if the new instruction line is about an instruction line requiring a suspension of interrupt routine, then
    if the new instruction line is about an instruction line requiring a suspension of interrupt routine, prevent the loading of another new instruction line from the main external memory, or
    otherwise, selectively authorize or prevent the loading of the other new instruction line from the main external memory only according to the value of the state variable (status) of the loader.

4. The asynchronous processor core as claimed in claim 1, wherein the sleep state (S1) or execution state (S2) as well as the value of the state variable (status) of the loader to authorize or prevent the loading of a new instruction line is information data stored in respective status registers of the processor core to which the execution controller has reading and/or writing access.

5. The asynchronous processor core as claimed claim 1, including a receiver configured to receive and store debugging instructions.

6. The asynchronous processor core as claimed in claim 5, wherein the receiver includes control registers (CMD) accessible to read by the execution controller and provided for the recording, by a debugger outside of the processor core having writing access to these control (CMD) registers, of the debugging instructions.

7. The asynchronous processor core as claimed in claim 5, wherein the debugging instructions comprise:
    an instruction for suspending interrupt routine in the process of execution,
    an instruction to restart suspended interrupt routine,
    an instruction to execute one single interrupt routine instruction line,
    and wherein the execution controller is configured to, in considering each debugging instruction:
    update the value of the state variable (status) of the loader to prevent the loading of a new instruction line when the debugging instruction is about an interrupt routine suspension instruction,
    authorize the loading of a new instruction line and update the value of the state variable (status) of the loader to authorize the loading of a new following instruction line when the debugging instruction is about an instruction to restart interrupt routine,
    authorize the loading of a new instruction line when the debugging instruction is about an instruction to execute one single interrupt routine instruction line.

8. A microcontroller for a communicating sensor node, which has an architecture comprising:
    a wake-up processor that can be activated upon receipt of interrupt control signals,
    a main processor that can be activated only when requested by the wake-up processor,
    wherein:
    the wake-up processor comprises at least one asynchronous processor core as claimed in claim 1, including functional units configured to exchange data between the microcontroller and at least one peripheral, to manage a wake-up protocol, and to manage functioning frequencies and powers of communicating sensor node components, and
    the main processor is configured to execute complex calculations not made by the wake-up processor.

9. The microcontroller as claimed in claim 8, comprising a debugger associated with the wake-up processor and having access thereto, via an asynchronous data transmission bus, the debugger being configured to send sending debugging instructions.

10. The microcontroller as claimed in claim 8, comprising a main memory associated with the wake-up processor, this main memory comprising instruction lines of at least one interrupt routine and being accessible by the wake-up processor, via an asynchronous data transmission bus, for a sequential loading of instruction lines.

11. the microcontroller as claimed in claim 8, wherein the functional units are implemented by at least one arithmetic logic unit.

12. An asynchronous processor core, that can be activated for the sequential execution of instructions upon receipt of interrupt control signals, comprising:
- a loader configured to sequentially load, based on a state variable (status) thereof, instruction lines from a main memory which is external to the processor core,
- a decoder configured to decode instruction lines loaded by the loader into executable instructions,
- at least one arithmetic logic unit configured to execute the executable instructions, and
- an execution controller configured to place the asynchronous processor core selectively in one of a two-state automaton, the two-state automaton including:
- a sleep state (S1) wherein the asynchronous processor core awaits an interrupt control signal to execute an interrupt routine, and
- an execution state (S2) wherein the asynchronous processor core executes an interrupt routine and the decoder awaits a new interrupt routine instruction line to be decoded, and
- the execution controller further manages the state variable (status) of the loader to selectively authorize or prevent, according to at least a value of the state variable (status) of the loader, the loading of a new instruction line by the loader when the asynchronous processor core is in the execution state and at least one additional new instruction line is to be loaded.

13. The asynchronous processor core as claimed in claim 1, wherein the loader receives a continue signal when loading of the new instruction line is authorized, and the loader does not receive the continue signal when loading of the new instruction is prevented.

* * * * *